Patented Jan. 5, 1954

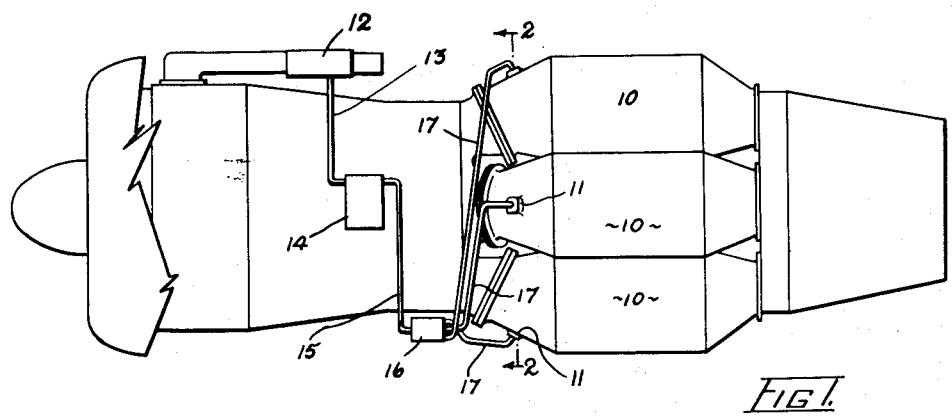
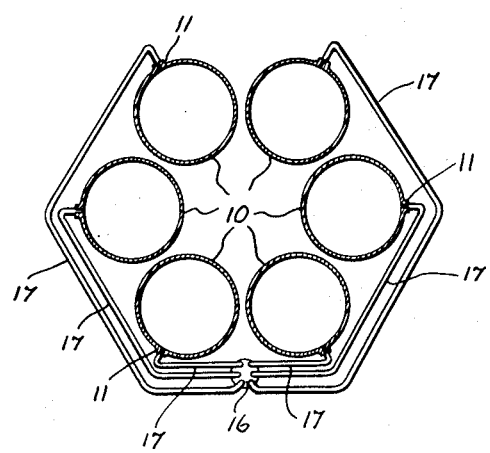

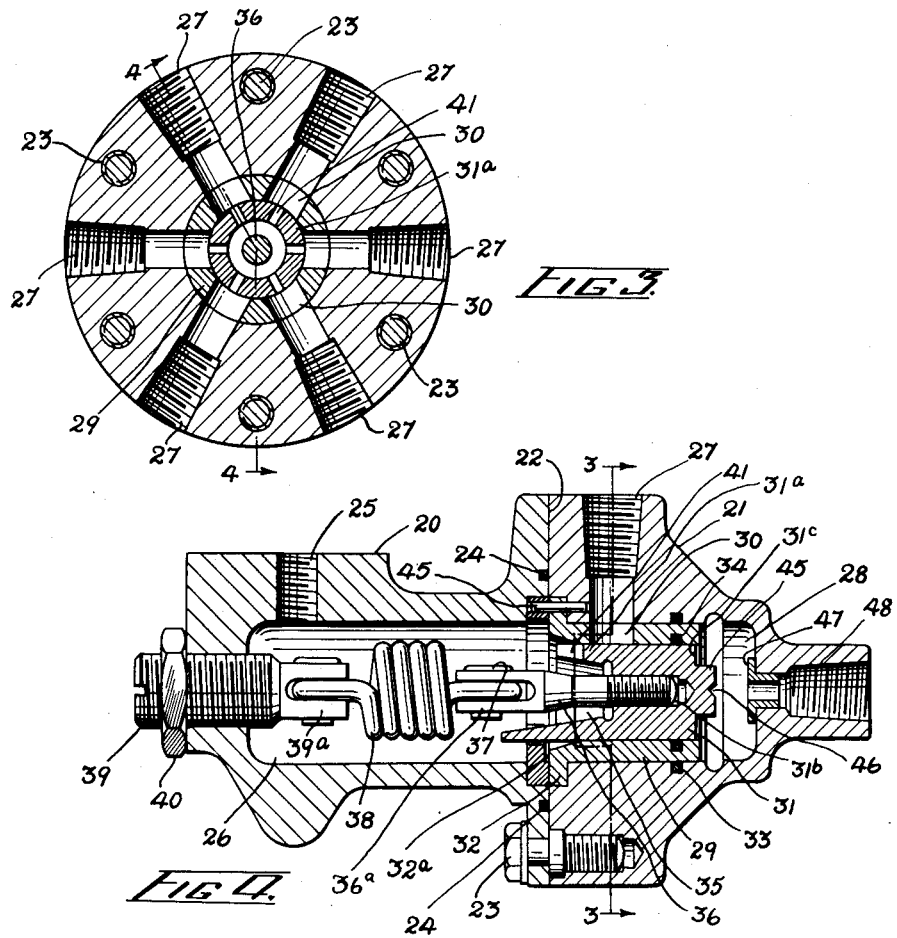
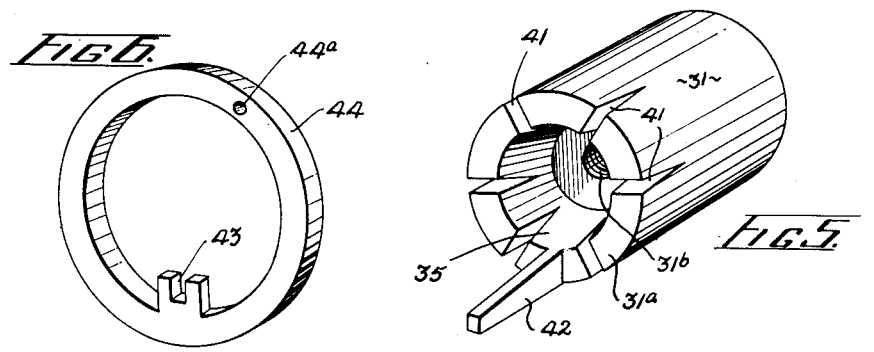

2,664,910

UNITED STATES PATENT OFFICE 2,664,910

FLOW DISTRIBUTOR VALVE

Winnett Boyd, Bobcaygeon, Ontario, Ronald Guerin Meschino, Toronto, Ontario, and Kenneth William Jay, Weston, Ontario, Canada, assignors to A. V. Roe Canada Limited, Malton, Ontario, Canada, a corporation Application June 17, 1950, Serial No. 168,704

1 Claim. (Cl. 137—118)

This invention relates to improvements in flow distributor valves, with particular reference to flow distributor valves for use in the fuel systems of gas turbine engines.

In a gas turbine engine embodying a plurality of tube type combustion chambers, the distribution of fuel equally between the combustion chambers under all conditions of fuel flow is not easy to achieve, because of the very wide range of volumetric flow which is encountered. In a typical example, the fuel required at full power is approximately forty times the fuel requirement at idling speeds and it will be understood that, if distribution were effected by the use of simple, calibrated, flow-regulating orifices in a distributor unit, a pressure range of approximately 1600:1 would be required at the inlet of the said unit. Furthermore it is inevitable that fuel supplied from a pump, through a common distributor, to the burners in the respective combustion chambers will be subjected to varying degrees of head and length of fuel line between the said distributor and the burners, and unless these variations are of a small order in comparison with the overall pressure drop from the pump to the burners they will result in unequal distribution of fuel. From the latter consideration it will be seen that the pressure at the inlet of the distributor must be comparatively high, even at low rates of flow to the burners, and it follows, bearing in mind the former consideration, that the use of simple flow-regulating orifices in the distributor will entail excessive and quite impracticable pressures at high rates of flow.

It is necessary therefore to employ a distributor valve having flow-regulating orifices which are variable with variations in supply pressure, so that the wide range of volumetric flow can be achieved without recourse to excessive supply pressures; those skilled in the art will know that this is common practice and that several types of variable orifice distributor have been used.

The principal difficulty associated with the variable orifice distributor valve lies in its manufacture: a very high order of accuracy is required to ensure that, at a given supply pressure, the discharge through each orifice is substantially equal to the discharge through each of the other orifices.

The main object of this invention is to provide a variable orifice distributor valve which may be readily manufactured to the high order of accuracy required for uniform distribution at all supply pressures. Other objects and advantages of the invention will be apparent during the course of the following description.

In the accompanying drawings forming a part of this application and in which like reference characters designate like parts throughout the several views:

Fig. 1 is an elevational view, partly broken away, of a gas turbine engine showing diagrammatically a fuel system embodying the invention;

Fig. 2 is a transverse sectional view taken on the line 2—2 in Fig. 1, some details having been omitted for the sake of greater clarity;

Fig. 3 is a transverse sectional view of a distributor valve constructed according to this invention and taken on the line 3—3 in Fig. 4;

Fig. 4 is a longitudinal sectional view of the valve, taken on the line 4—4 in Fig. 3;

Fig. 5 is a perspective view of the flow-regulating piston of the valve;

Fig. 6 is a perspective view of a ring forming part of the valve.

Referring particularly to Figs. 1 and 2, the engine illustrated has six combustion chambers 10, each having the usual combustion systems for burning liquid fuel, including a suitable burner (not shown). An inlet connection 11 on each of the combustion chambers 10 is connected to the burner in the particular combustion chamber. Fuel is received from the main supply by a pump 12 and is passed from the pump through a line 13 to a flow control unit 14. From the flow control unit it passes through another line 15 to a distributor valve 16. Connecting lines 17 convey the fuel from the distributor valve 16 to each of the burner inlets 11. It should be noted that the uniformity of distribution of fuel between the six burners is dependent upon the accurate performance of the distributor valve 16 under all conditions of fuel pressure and flow.

The distributor valve 16 is shown in detail in Figs. 3 and 4. The body of the valve comprises an inlet part 20 and an outlet part 21 joined at their opposed faces 22 by suitable bolts 23. The joint between the faces 22 is rendered pressure-tight by an O-ring 24, accommodated in a groove in the inlet part 20 and bearing on the outlet part 21.

The fuel inlet to the valve is provided by the inlet passage 25 leading into a cylindrical inlet chamber 26. Six outlet passages 27, to which the several lines 17 are connected, extend radially from a cylindrical outlet chamber 28 in the part 21, the two chambers 26 and 28 together in effect constituting a single substantially enclosed chamber.

A liner 29, having circumferentially disposed ports 30 which register with the outlet passages 27, is disposed in the chamber 28 and a piston 31 is slidably mounted within the liner 29. The position of the liner in the chamber 28 is fixed longitudinally by a flange 32 on the liner; the flange fits into an annular recess in the outlet part 21, so that the exposed surface 32ᵃ of the said flange is flush with the face 22. An O-ring 33 accommodated in a groove in the cylindrical wall of the chamber 28 provides a seal between the said wall and the outer surface of the liner 29. Another O-ring 34, accommodated in a groove in the inner surface of the liner 29, is provided to minimize leakage between the liner and the piston 31. The piston 31 has a truncated conical recess 35 defined by a piston skirt 31ᵃ and terminating in a threaded recess 31ᵇ.

One end of a piston rod 36 is threaded into the piston 31 and protrudes through the piston skirt 31ᵃ, and a fork-eye 36ᵃ which is provided at its other end is attached by a pin 37 to one end of a coil spring 38. The coil spring 38 lies within the chamber 26 and is fastened at its other end to the fork end 39ᵃ of an adjusting screw 39. The fork end 39ᵃ of the adjusting screw is swivel mounted so that rotation of the screw during adjustment will not tend to twist the spring or to unscrew the piston rod in the piston. The adjusting screw is threaded in a tapped hole in the end wall of the inlet chamber 26 and is provided with a locknut 49.

The general form of the piston skirt 31ᵃ is better illustrated in Fig. 5. Symmetrically disposed in the piston skirt are six longitudinally tapering V-slots 41, whereby the skirt constitutes a flow regulating device. These slots extend longitudinally from the extremity of the piston skirt, and each slot is a tapered notch defined by wall-planes intersecting in an apical line which lies in a radial plane perpendicular to the axis of the piston; the slots are therefore of constant depth throughout their radial length. The term "constant depth" as used herein, is used in the sense of the preceding sentence and does not necessarily imply that the longitudinal length of the slot is constant across the wall-thickness of the piston skirt; for example, the extremity of the piston skirt may be bevelled, thereby shortening the longitudinal length of the slot within the scope of the bevel, though the depth will remain constant so long as the apical line lies in a radial plane. The slots are disposed in diametrical pairs so that each pair in effect forms a groove of constant depth extending diametrically across the base of the piston and interrupted by the recess 35.

A tongue 42 integral with the piston skirt 31ᵃ extends longitudinally from the base of the skirt. This tongue slidably engages a guide 43 in a ring 44, the ring 44 being mounted in an annular recess in the inlet part 26 so that the face of the ring is flush with the faces 22 and abuts against the flange 32 of the liner 29. A dowel 45, passing through a hole 44ᵃ in the ring 44 and through the flange 32 into the outlet part 21, prevents rotation of the ring 44 and of the liner 29 relative to the outlet part 21, and positively fixes the position of the ports 30 in registration with the outlet passages 27. The ring 44 acting upon the tongue 42 prevents any rotation of the piston relative to the body, and ensures positive longitudinal alignment of the V-slots 41 in the piston with the ports 30 in the liner, as better shown in Fig. 3.

The crown 31ᶜ of the piston 31 is provided with a boss 45 having a transverse groove 46 across its face, as better shown in Fig. 4. When, by extension of the coil spring 38, the piston moves towards the right of its position in Fig. 4, its travel is limited by the boss 45 coming into contact with a stop 47 provided on the end wall of the outlet chamber 28. The stop 47 is constituted by a shouldered bushing, the bore of which gives access to a drain outlet 48 in the end wall of the outlet chamber 28.

The distributor valve is installed in the fuel system by connecting the line 15 to the inlet passage 25, the lines 17 to the outlet passages 27 and a drain line to the outlet 48. In operation, fuel from the flow control unit 14 enters the chamber 26 through the inlet 25 and the supply pressure causes the piston 31 to move to the right (with respect to its position in Fig. 4) against the restraining influence of the spring 38. As this movement takes place, the apices of the V-slots 41 come into registration with the ports 30 and a progressive increase of the supply pressure will cause the V-slots to be in effect progressively interposed between the inlet passage 25 and the outlet passages 27, forming, with the said ports, flow-regulating orifices whereby fuel is admitted to the outlet passages 27 and thence through the lines 17 to the burners. The effective area of each flow-regulating orifice is bounded in part by the edge of the V-slot on the outer cylindrical surface of the piston skirt and in part by the edge of the port 30 on the inner cylindrical surface of the liner. When the valve is fully open the piston will come to rest against the stop 47.

Any leakage of fuel past the piston into the right hand end of the chamber 28 is free to escape through the stop 47 to the drain outlet 48. Even when, at extreme travel, the boss 45 is bearing against the stop 47, drainage is unobstructed since the groove 46 disrupts the continuity of the surface of the boss bearing on the surface of the stop.

It will be readily understood that equality of distribution of fuel to the several burners, under varying pressure of the supply from the flow control valve, is dependent upon the accuracy with which the V-slots 41 and the ports 30 are formed and located. The ports do not present a very difficult manufacturing problem and in any case only a small proportion of the periphery of each flow-regulating orifice is provided by the periphery of the associated port 30. However the accurate formation and matching of the V-slots requires careful and well controlled lapping operations. It will be noted that according to the construction described the said slots, being of constant depth and extending as they do to the end of the piston skirt, may be lapped in diametrical pairs by a straight-forward operation thereby facilitating accurate manufacture.

The terms "V-slot" and "V-shaped slots" and their derivatives as used in the description and claims are to be taken as including not only slots having straight tapering sides which meet at an angle, but also any slots having generally tapering sides which may not meet at an angle but may be joined by a curved or straight wall forming the end or "point" of the slot.

It is to be understood that applications of the invention herewith shown and described are to be taken as typical examples of the same and that various changes in the size, number and arrangement of the parts may be resorted to without departing from the spirit of the invention or the scope of the subjoined claim.

What we claim as our invention is:

A pressure responsive flow distribution valve for the precise distribution of liquid from a main conduit to a plurality of branch conduits comprising, a body containing a generally cylindrical chamber having an inlet end and a side wall in which is provided an annular recess, a guide ring in the recess, an inlet passage in the body communicating with the main conduit and leading into the inlet end of the chamber, a plurality of outlet passages in the body each communicating with one of the branch conduits, a cylindrical liner in the chamber having a plurality of outlet ports each disposed in registration with one only of the outlet passages, rigid members locking the ring and the liner to the body for preventing relative rotation between the ring and the liner and the body, a cylindrical piston slidable in the liner and having a skirt at the end of the piston facing the inlet end of the chamber, the skirt of the piston constituting a hollow extension, toward the said inlet end, of the cylindrical periphery of the piston, said piston being actuatable toward the other end of the chamber by fluid under pressure in the inlet passage, a tongue extending from the said end of the piston and slidably positioned in the guide ring to prevent rotation of the piston around its longitudinal axis, and a helical spring in the chamber connecting the piston to the body at the said inlet end of the chamber and urging the piston toward the inlet passage to a position in which the peripheral surface of the piston closes the said outlet ports, the end of the piston skirt having a plurality of V-shaped slots each tapering from the end of the skirt to the point of the V of the skirt in a direction substantially parallel to the axis of the piston, the slots being arranged around the said end in diametrical pairs and each being in longitudinal alignment with one only of the outlet ports, movement of the piston away from and toward the inlet passage causing a progressively greater and lesser area of each of the V-shaped slots to come into registration with its respective outlet port for distribution of liquid from the inlet passage to the outlet ports.

WINNETT BOYD.
RONALD GUERIN MESCHINO.
KENNETH WILLIAM JAY.

References Cited in the file of this patent

UNITED STATES PATENTS

| Number | Name | Date |
|---|---|---|
| 613,623 | Dolan | Nov. 1, 1898 |
| 1,150,743 | Butts | Aug. 17, 1915 |
| 1,962,549 | Bjorkland | June 12, 1934 |
| 2,011,333 | Clifton | Aug. 13, 1935 |
| 2,147,845 | Kistner | Feb. 21, 1939 |
| 2,161,507 | Eaersdorf | June 6, 1939 |
| 2,308,583 | Berges | Jan. 19, 1943 |
| 2,536,440 | Greenland | Jan. 2, 1951 |

FOREIGN PATENTS

| Number | Country | Date |
|---|---|---|
| 613,965 | France | of 1926 |